United States Patent [19]

Facchini

[11] 4,427,131
[45] Jan. 24, 1984

[54] CAPSULE ORIENTING DEVICE, PARTICULARLY FOR CAPSULE-FILLING OR PROCESSING MACHINES

[75] Inventor: Libero Facchini, Bologna, Italy

[73] Assignee: Farmatic S.r.l., Ozzano Emilia, Italy

[21] Appl. No.: 91,847

[22] Filed: Nov. 6, 1979

[30] Foreign Application Priority Data

Nov. 9, 1978 [IT] Italy .................. 29650 A/78

[51] Int. Cl.³ .......... B65G 47/24; B65H 9/10
[52] U.S. Cl. ..................... 221/173; 198/400
[58] Field of Search ........... 221/173, 171; 198/400; 193/44, 47

[56] References Cited

U.S. PATENT DOCUMENTS 3,817,423  6/1974  McKnight ................ 221/173
3,838,766  10/1974  Wagers et al. ............ 198/400 X
4,091,600  5/1978  Itoh .................... 198/400 X Primary Examiner—F. J. Bartuska
Attorney, Agent, or Firm—Karl F. Ross; Herbert Dubno

[57] ABSTRACT

The invention relates to a capsule orienting device particularly for capsule-filling machines. The capsule orienting device comprises a bush delimiting inside thereof a calibrated path for the capsules to be loaded with product. The path communicates with a longitudinal slit in the bush. The bush also has an upper and a lower cross slot intersecting the path and the slit, and is designed to slidably and sequentially engage, in use, with a first abutting member and a second abutting member so as to cause a capsule in the path to rotate upwards or downwards depending on the arrangement of the capsule in the path, thereby orienting the capsule.

2 Claims, 5 Drawing Figures

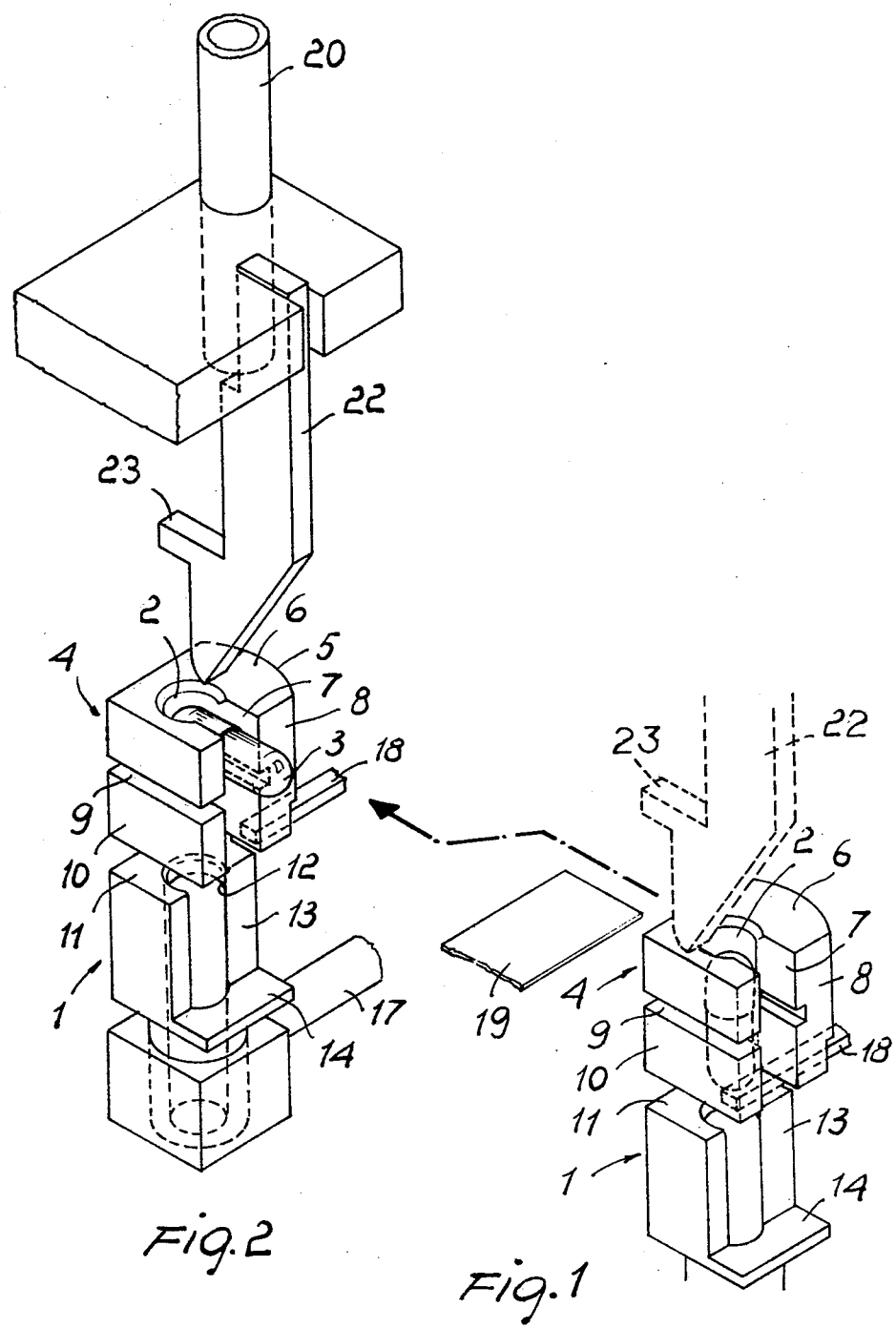

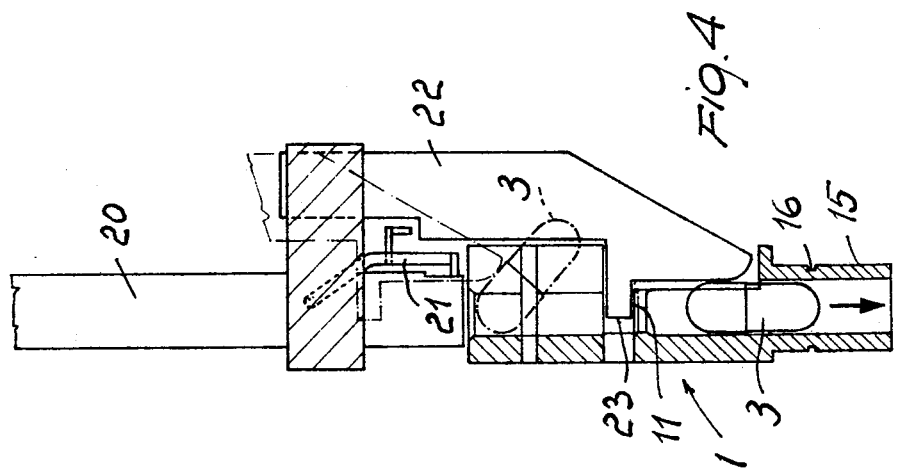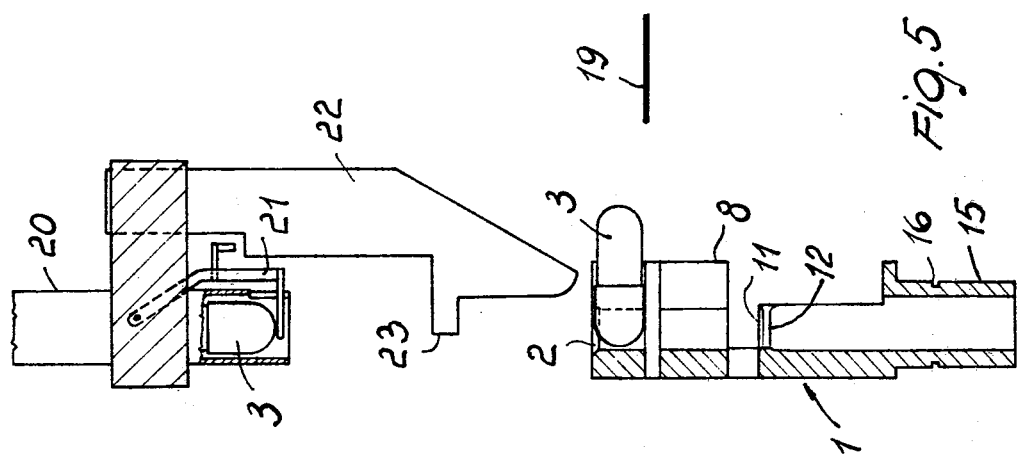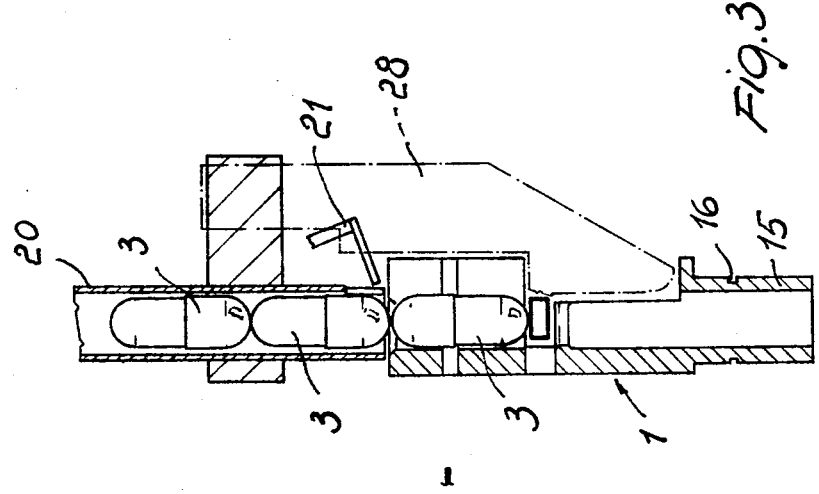

CAPSULE ORIENTING DEVICE, PARTICULARLY FOR CAPSULE-FILLING OR PROCESSING MACHINES

BACKGROUND OF THE INVENTION

The present invention relates to a capsule orienting device, particularly suitable for continuous-operation capsule-filling or processing machines.

Capsule-filling machines are arranged to package loose powder or grain products. An entire packaging operation comprises a plurality of steps one of which is opening the capsules to be filled, i.e. separation of their cap from a respective body or bottom. To do this, it is necessary, in the first place, to orient or position in a given way the capsule supplied by a container or magazine where they are randomly placed.

SUMMARY OF THE INVENTION

An object of the present invention is to provide a capsule orienting device capable of orienting in a simple, safe and economic manner all the capsules supplied to it.

Another object of the present invention is to provide a capsule orienting device substantially comprising one element arranged between orienting and conveying stations for capsules.

Another object of the present invention is to provide a capsule orienting device which makes it possible a rapid adaptation to various sizes of the capsules to be oriented.

Another object of the present invention is to provide a capsule orienting device economic to manufacture.

Another object of the present invention is to provide a capsule orienting device arranged to orient capsules tangentially with respect to the theoretic realize diameter, in the direction of operation of the capsule orienting machine, thereby eliminating possible jamming of the capsules.

According to the invention there is provided a capsule orienting device comprising a bush element delimiting inside thereof a calibrated path for the capsules to be oriented and communicating with a longitudinal slit, and an upper cross slot and a lower cross slot intersecting the said path and the said slit, the bush element being arranged sequentially and slidably to engage, in use with a first abutting member designed to enter the lower slot to stop a capsule descending along the path, and with a second abutting member designed to enter the upper slot and to overturn the capsule stopped by the first abutting member, so that the capsule is rotated upwards or downwards depending on the arrangement of the capsule within the path, thereby orientating the capsule.

BRIEF DESCRIPTION OF THE DRAWINGS

The invention is further described below with reference to the accompanying drawings which illustrate a preferred embodiment, and in which:

FIG. 1 is an elevational perspective view of a capsule orientating device;

FIG. 2 is a perspective view similar to FIG. 1 showing a capsule while being oriented;

FIG. 3 is an elevational cross-sectional view of the capsule orienting device of FIGS. 1 and 2;

FIG. 4 is a view similar to FIG. 2 showing a capsule orienting device in an intermediate step of an orienting process; and FIG. 5 is an elevational view with parts in cross-section of the capsule orienting device of FIG. 2.

DESCRIPTION OF THE PREFERRED EMBODIMENTS

With reference to the above described Figures, a capsule orienting device substantially comprises a shaped bush 1. The bush 1 has a substantially parallelepipedic body delimiting inside thereof a calibrated path 2 for capsule 3, the path 2 extending substantially coaxially with respect to the bush 1. The bush 1 is supported on a capsule-filling machine with its path 2 vertically arranged. In its mounted position, the bush 1 has, at its upper end 4, an extension 5 shaped as a cylindrical segment arranged on the side of the bush facing the axis of rotation (not shown) of the capsule-filling machine, the extension 5 having a relatively large flat surface 6 at the top of the bush. The end 4 is also formed with a vertically extending longitudinal slit 7 which puts the path 2 into communication with the outside. The slit 7 is formed in a side 8 of the body of the bush, the side 8 being arranged so as to be located downstream of the side 5 with respect to the direction of rotation of the capsule-filling machine.

The end 4 is also formed with a horizontal slot 9 which starting from the outer side 10 opposite to the side 5 extends inwardly to a depth greater than the depth of the path 2 throughout the width of the bush. Underneath the slot 9 and at a distance from it depending on the dimensions of the capsule to be oriented, the body of the bush 1 is formed with a lower horizontal slot 11 extending from the side 8 to such a depth as to go beyond the path 2. The path 2 has a slight bottle neck 12 below the lower cross slot 11 to prevent free falling of the capsules within the bush 1 along the path 2.

At its central portion 10, below the slit 11, the bush 1 on its side 8 is sectioned along a vertical plane passing substantially along the central line of the path 2, thereby having a depression 13 which is delimited at its upper end by the slit 11 and at its bottom by a horizontal abuttment 14. The lower end 15 of the bush 1 is tubular and coaxial with the path 2 and also has an annular groove 16 for connection to a support arm 17 (FIG. 2).

The bush 1 is designed to cooperate with a first abutting member 18 which is rigid with the capsule-filling machine and arranged to slidably engage with the slit 11, as well as a second fixed abutting member 19 rigid with the fixed support structure of the capsule filling machine and designed to slidably engage with the slit 9.

Capsules 3 are loaded or fed into the bush 1 by means of a tube 20 supported by moving portions of the capsule-filling machine. The lower end of the tube 20 is designed to rest on the upper face 6 of the bush 1. As is better illustrated in FIG. 3, at the end of the descent of the tube 20, a lever 21 which is arranged to hold the capsules 3 within the tube 20 abuts against an abutting member (not shown) which causes the lever to move so as to depart from the tube 20, thereby freeing its lower end and allowing a capsule 3 to enter the bush 1. The lever 21 is thus urged towards its closed position in which it is arranged across the path of the capsules within the tube 20. The lever 21 also has a return spring (not shown) so that should the lever 21 not return to its closed position, e.g. because the capsule 6 which immediately follows the capsule which has just entered the bush 1 has partly entered the path 2, the bush 1 is further moved radially outwardly with respect to the tube 20 towards the central axis of the capsule-filling machine. Thus, the flat surface 6 of the bush will causes the capsules 3 to slightly enter the tube 20, whereby the lever 21 will move to its abutting position. While still in its operating position shown in FIG. 1, the bush 1 has its slot 11 in engagement relationship with the abutting member 18 which stops the descend of the capsules 3 along the path 2 within the bush. From the position shown in FIG. 1, the bush 1 is moved to the position shown in FIG. 2, i.e. radially outwardly with respect to the central axis of the capsule-filling machine. Before this movement, the bush engages with a fixed abutting member 19 which slidably enters the slit 9 and overturns upwards (as shown in FIG. 2), or downwards the capsule 3 within the bush 1 depending upon whether the capsule has entered the path 2 with its bottom or its cap directed downwards. The width of the slit 7 is slightly smaller than the diameter of the capsules 3, whereby each capsule once it has been horizontally arranged or overturned by the abutting member 19, is slightly jammed, and thus it is held in that position within the slit 7.

The bush 1 is subsequently moved to an operating position below a releasing device or pusher 22, which is arranged to vertically descend within the bush 1 along the path 2 of the slit 7. The releasing device 22 acts with its lower tip on the capsule 3 horizontally arranged within the path 2 and the slit 7, so that the capsule 3 rotates through 90° to be placed again in the path 2 but surely with its bottom directed downwards and its cap directed upwards (oriented position, see FIG. 3). Once the capsule has been placed again in the path 2, it is released from the bush 1 (which has moved away, in the meantime, from the range of action of the abutting member 18) by an extention 22 of the device 22 (FIG. 4).

It should be noted that owing to the slight bottle neck 12, once the bush 1 is bought out of the range of action of the abutting member 18, a capsule 3 in the path 2 cannot freely fall out of the bush. It is only after the intervention of the extention 23 of the pusher 22 that a capsule 3 can be definitely expelled from the oriented device according to the sequential operation of the capsule-filling machine.

At this point, the feeding tube 20 can be lowered again and the orienting cycle can start again with a new capsule.

The orienting device described above is susceptible to numerous modifications and variations which are to be considered as falling within the scope of the present invention as defined by the following claims.

I claim:

1. A capsule orienting device, particularly for capsule-filling machines for filling capsules composed of a cap and a bottom, said device including a bush element defining a calibrated passage therein for the capsules to be loaded with product, a longitudinal slit communicating with said passage, an upper cross slot and a lower cross slot arranged to intersect said passage and said slit, the bush element being designed, in use, to sequentially engage with a first abutting member designed to enter the lower slot to stop the descent of a capsule fed into the passage and with a second abutting member designed to enter the upper slot and to engage the capsule stopped by the said first abutting member, thereby causing the capsule to rotate upwards or downwards depending on the arrangement of the capsule in the passage and to be disposed horizontally with its cap in said passage and its bottom projecting from and frictionally held in said longitudinal slit, a pusher being further provided having an extention movable along said passage and a portion movable along said longitudinal slit and adapted to orient the horizontally arranged capsules in alignment with said passage, wherein according to the improvement said device further comprises a neck in said passage underneath said lower slot on which the capsules rest after being oriented by said pusher portion and through which the capsules are forced by said pusher extension.

2. A capsule orienting device according to claim 1 wherein said bush element is movable with respect to the pusher between a position of receiving the capsules to be oriented in which the capsules are stopped by said first abutting member and a position in which said passage and longitudinal slit are in alignment with said extension and said portion respectively and the capsules to be oriented rest on the top of the bush element.

* * * * *